United States Patent

[11] 3,630,113

| [72] | Inventor | Ernest Winston Ronai<br>56 Linden Ways, Sydney, New South Wales, Australia |
|---|---|---|
| [21] | Appl. No. | 8,965 |
| [22] | Filed | Feb. 5, 1970 |
| [45] | Patented | Dec. 28, 1971 |

[54] APPARATUS FOR CUTTING HELICALLY WOUND TUBES
10 Claims, 10 Drawing Figs.

| [52] | U.S. Cl. | 82/53.1 |
|---|---|---|
| [51] | Int. Cl. | B23b 37/00 |
| [50] | Field of Search | 82/53.1 |

[56] References Cited
UNITED STATES PATENTS

| 3,158,074 | 11/1964 | Brigham | 82/53.1 |
|---|---|---|---|
| 3,254,549 | 6/1966 | Ronai | 82/53.1 |
| 3,369,432 | 2/1968 | Davis | 82/53.1 |

*Primary Examiner*—Harrison L. Hinson
*Attorney*—John W. Adams

ABSTRACT: This invention relates generally to tube cutoff equipment, and particularly to a continuously operating cutoff mechanism having a plurality of uniformly spaced straightedge cutting knives mounted thereon.

INVENTOR.
ERNEST WINSTON RONAI
BY
John W. Adams
ATTORNEY

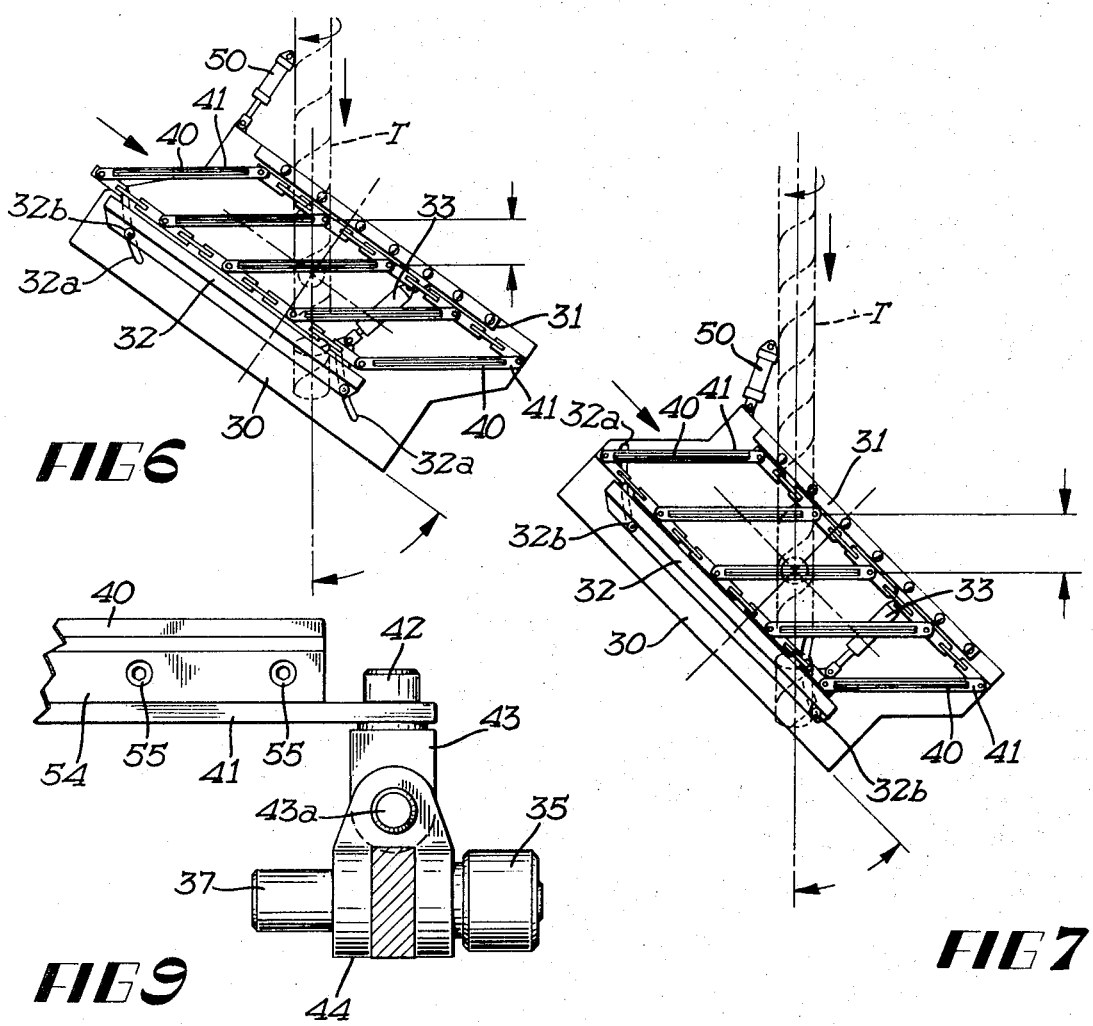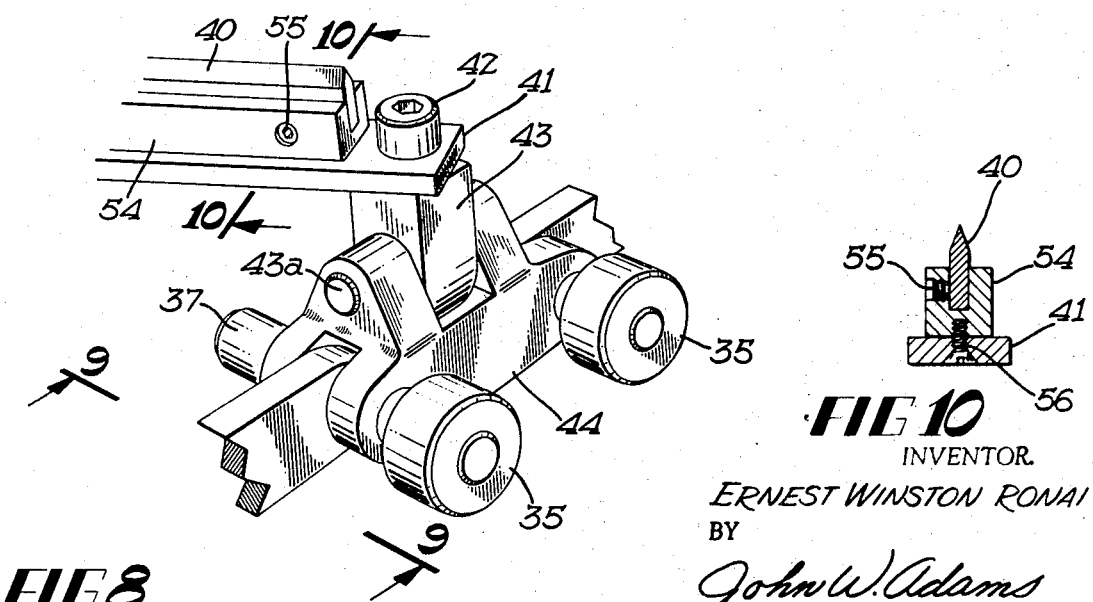

APPARATUS FOR CUTTING HELICALLY WOUND TUBES

This invention is related to the invention disclosed and claimed in my prior U.S. Pat. No. 3,254,549.

The cutoff knives embodied in the prior invention constitute circular rotary disc members, which are relatively expensive to sharpen and replace. The present invention, however, embodies straight cutoff knives mounted on an endless continuously operating conveyor mechanism which greatly reduces the maintenance and replacement costs of the knives, while still providing the same advantages of the continuously operating disc cutoff mechanism which has proved superior to the back and forth reciprocating cutoff mechanism previously known.

It is an object of the present invention to provide a continuously operating cutoff mechanism capable of extremely high-speed operation and embodying straight cutoff knives capable of low-cost maintenance and replacement.

More specifically, it is an object to provide tube cutoff apparatus which incorporates an endless conveyor mechanism with straight knives mounted thereon, the axis of movement of the conveyor being disposed at an acute angle to the cutoff mandrel on which formed tubing is moving axially, and the straight knives mounted on the conveyor mechanism are disposed at an angle to the axis of the conveyor to position the knives at right angles to the mandrel axis during the cutting engagement between the knives and the cutoff mandrel.

It is a further object of this invention to provide a readily adjustable continuous mechanism which may be quickly adjusted to cutoff different lengths of tubing.

It is yet another object of this invention to provide a dual adjustment of conveyor carriage angle with respect to the cutoff mandrel and knife angle with respect to the conveyor, so that the length of tubing cut may be adjustably varied while maintaining a perpendicular relationship between knives and cutoff mandrel.

These and other objects and advantages of this invention will be apparent from the following description made in connection with the accompanying drawings, wherein like reference characters refer to similar parts throughout the several views, and in which:

FIGS. 6 and 7 are diagrammatic views showing the knife and conveyor relationships in two different angular adjusted positions;

FIG. 8 is a fragmentary perspective view showing the connection between the knife mounting plate and the conveyor linkage;

FIG. 9 is a vertical sectional view taken substantially along the line 9—9 of FIG. 8;

FIG. 10 is a sectional view taken substantially along the line 10—10 of FIG. 8.

Figure 1:
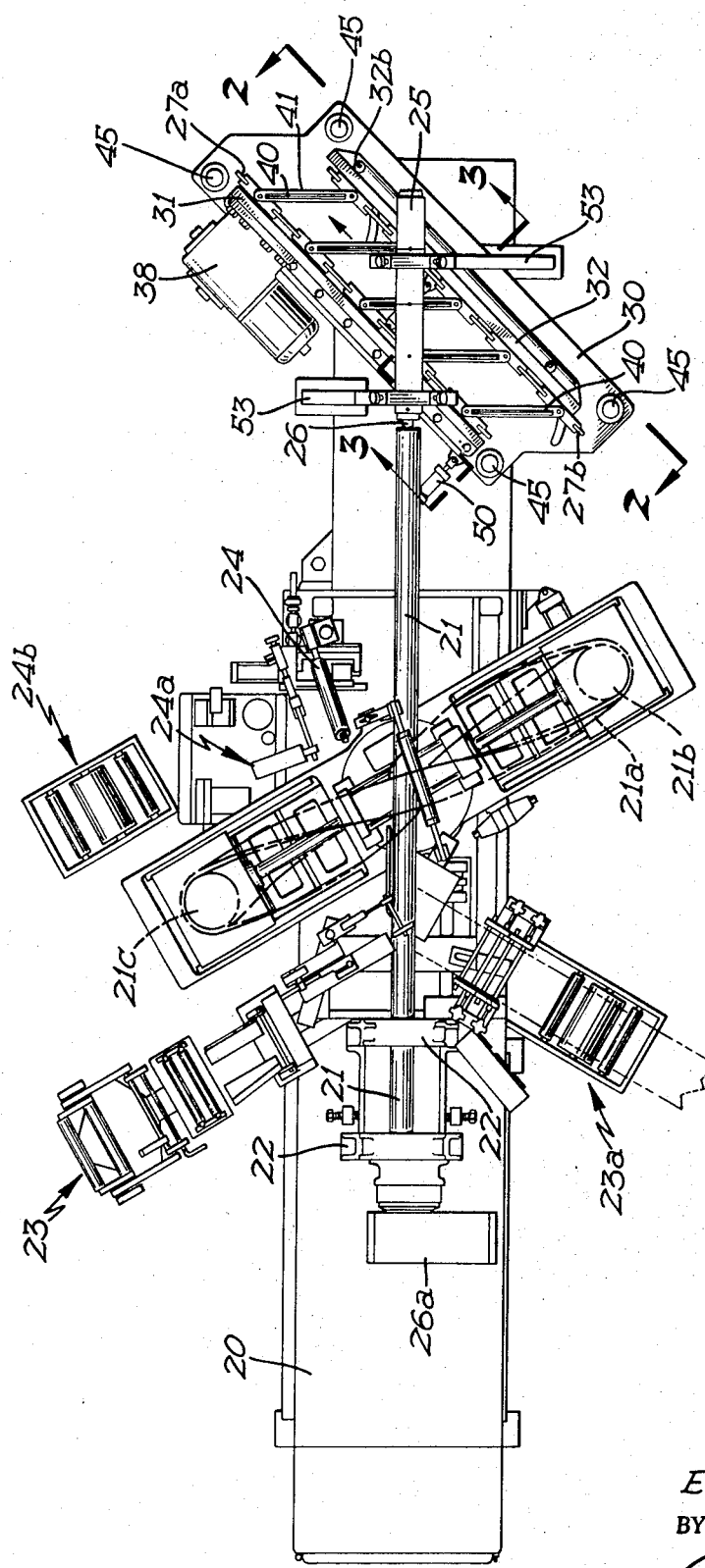
FIG. 1 is a top plan view showing a spiral tube winding machine with my new continuous cutoff apparatus mounted for operation in conjunction therewith.

The tube producing mechanism illustrated constitutes a helical or spiral winding mechanism which is shown in top plan view in FIG. 1. The winder embodies a support base 20 having a hollow winding mandrel 21 rigidly mounted thereon, as by means of the mandrel mounting clamps 22 which provide rigid cantilever support for one end of the mandrel 21. The mandrel 21 is cantilever supported from the clamps 22 so that the tubing being formed thereon, generally designated T in the figures, can travel freely in an axial direction towards the cutting mechanism. The winding mechanism illustrated includes a liner guiding and lubricating assembly 23 through which the liner lamination passes directly onto the winding mandrel 21. The paper or body-stock lamination passes through a guiding and gluepot assembly 23a which applies glue to the fiber body-stock lamination.

A winding belt 21a is provided and has a conventional driving system having drive capstans 21b and 21c to pull the liner and body lamination strips from supply rolls, not shown, onto the mandrel 21. If a liner lamination for the finished product is to be provided, it will precede the body lamination onto the mandrel and will have suitable antifriction means to permit slippage on the mandrel surface, such as a conventional slip-coat lacquer surface.

An outer label is applied down-stream from the belt and passes over the guiding roller 24 onto the tubing T being formed on the mandrel and traveling axially therealong. A photoelectric cell system 24a is focused on the label to provide control signals for adjustment of the cutoff mechanism to synchronize the cutting and winding operations. The label passes through a label gluepot 24b from the supply roll, not shown. The tubing travels axially outwardly on the winding mandrel 21 and passes onto the cutoff mandrel 25, which is rotated by a rotary drive shaft 26, which passes concentrically through the hollow winding mandrel 21 and is driven by a suitable power source 26a.

As in the cutoff mechanism disclosed in my prior U.S. Pat. No. 3,254,549, the cutoff mechanism constitutes an endless power-driven conveyor with the exception that the cutoff knives in the present invention have a straight cutting edge rather than the disc-shaped cutters shown in the prior patent. In order to maintain the proper cutting engagement between the cutting mandrel 25 and the cutting edges of the straight knives, the conveyor must be mounted at an acute angle to the axis of the mandrel 25, as best shown in FIGS. 1, 6, and 7. A pair of conveyor chains 27a and 27b are driven by a suitable power source and governed by a suitable speed control mechanism (not shown), which embodies the subject matter of a separate patent application.

Figure 3:
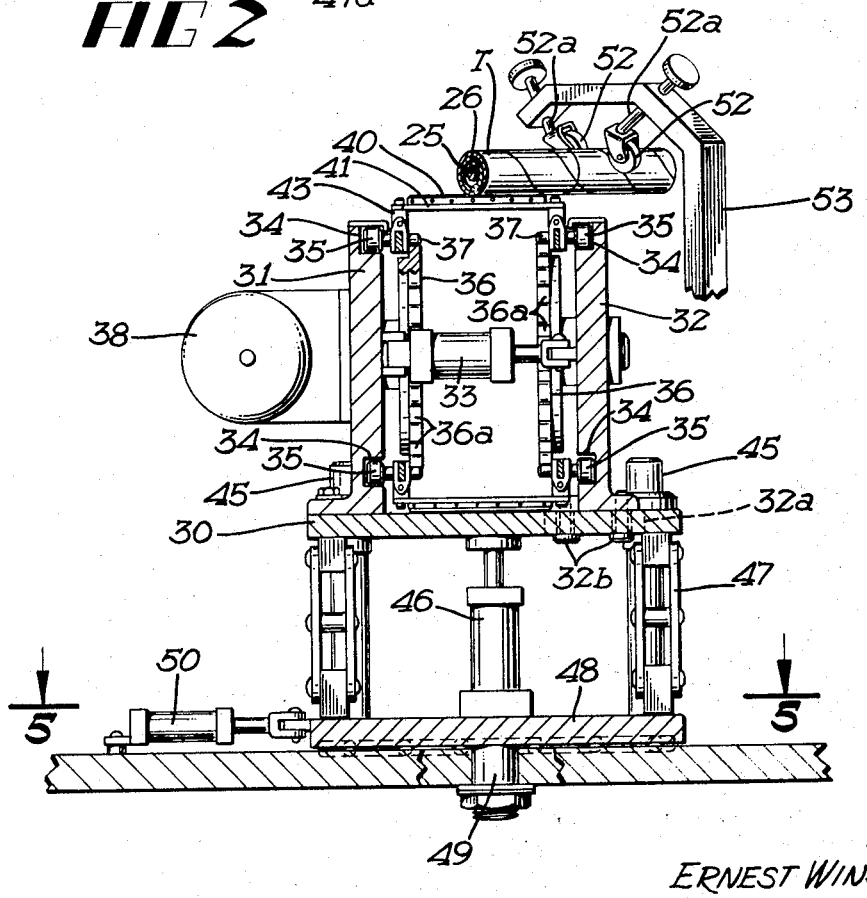
FIG. 3 is a fragmentary sectional view taken along the broken section line 3—3 of FIG. 1.
Figure 4:
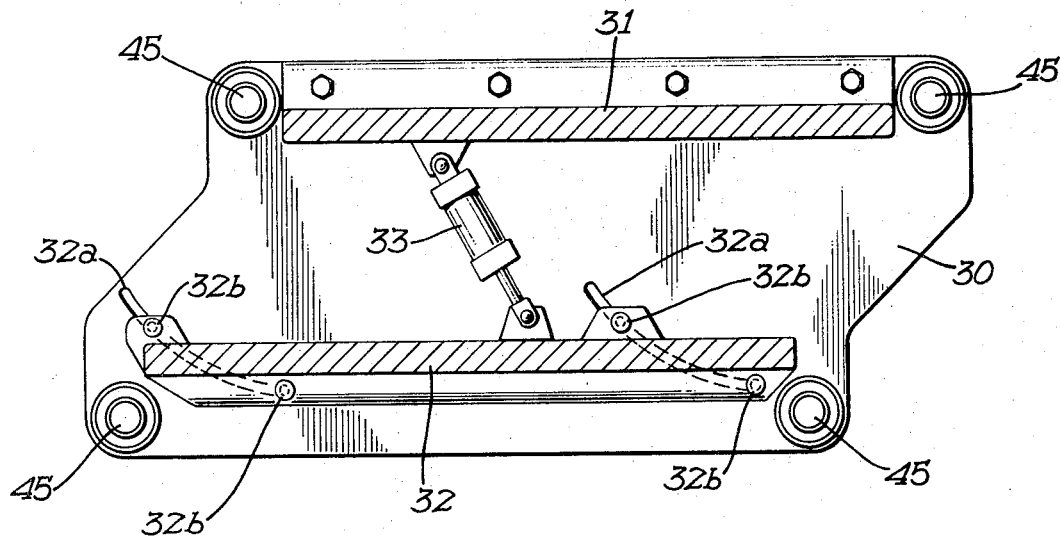
FIG. 4 is a horizontal sectional view taken substantially along the line 4—4 of FIG. 2.

The conveyor chains 27a and 27b are mounted on a baseplate 20. These chains are longitudinally offset so that the angularly mounted cutting knives will reach the ends of the upper and lower runs of the two conveyor chains at the same time. As best shown in FIGS. 3 and 4, a pair of sideplates 31 and 32 are mounted on side baseplate 30. The sideplate 32 is slidably mounted in arcuate slots 32a formed in the baseplate 30. Antifriction connecting pins 32b are slidably mounted in said slots to positively position said sideplate 32 in parallel opposed relation to sideplate 31, while still permitting the spacing between plates 31 and 32 to be adjustably varied as by the hydraulic cylinder 33, best shown in FIG. 4.

The sideplates 31 and 32 have trackways 34 formed therein, as shown in FIG. 4, and the conveyor chains 27a and 27b are respectively carried in said sideplates by means of pin and roller assemblies 35, respectively mounted in said trackways 34. The ends of each conveyor chain are trained about a pair of spaced-apart conveyor wheels 36. In the form shown, the wheels 36 are each independently mounted for rotation on the respectively adjacent portions of sideplates 31 and 32 which provide bearing mountings 36b for the respective wheels. No cross-shaft or axle is provided between opposed wheels at the ends of the conveyor chains so that the lateral spacing between the sideplates and the conveyor chains 27a and 27b may be adjusted. In addition, it will be appreciated that since the respective wheels of the conveyor chains are longitudinally displaced from one another, that the provision of an axle would be an unnecessary complication. One of each pair of wheels 36 for each conveyor chain is mounted in a slot with a resilient mechanism 36c so that the conveyor chain length may be adjusted and properly tensioned at the correct length. Each of the wheels 36 has a plurality of circumferentially spaced notches 36a formed therein to receive inwardly extending pin elements 37, spaced along the chains 27a and 27b.

In the form shown, only one of the wheels 36 is driven to provide the driving power for the entire knife carrying conveyor system. A variable speed power unit (the details of which are not shown) is designated by the numeral 38, as best shown in FIGS. 1 and 3.

The straight edge cutoff knives 40 are mounted on the chains 27a and 27b. Each of the knives 40 is carried by a mounting plate 41, and the respective ends of each of the mounting plates 41 have a two-axis pivotal connection to the conveyor chains. Vertical pins 42 pivotally connect the ends of the respective mounting plates 41 to pivot blocks 43, which in turn are respectively mounted for pivotal movement on pins 43a disposed longitudinally of the axes of the chains 27a and 27b, as best shown in FIGS. 8 and 9. The pins 43a mount the blocks 43 to the mounting links 44 in the conveyor chain. This universal joint-type connection between the knife carrying plates 41 and the conveyor chains is provided in order to permit the knives to move around the ends of the conveyor, and also, to permit adjustment of the lateral spacing between the conveyor chains. It will be appreciated that other suitable mechanical couplings may be provided which would allow the required mechanical movement.

Figure 2:
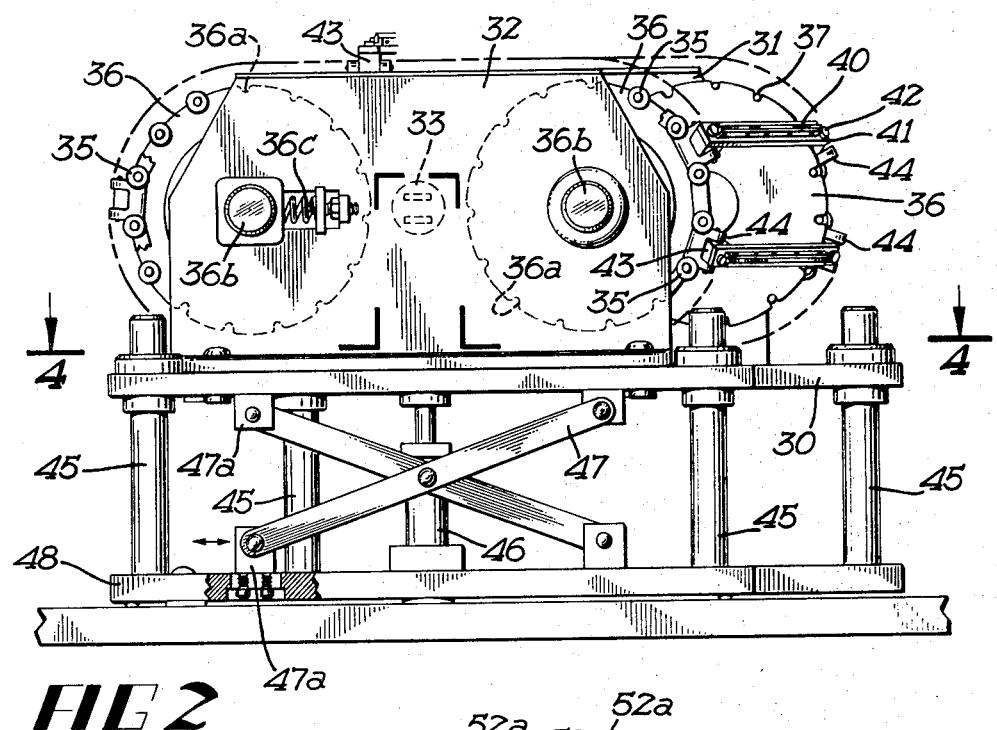
FIG. 2 is a fragmentary vertical elevational view taken substantially in the plane designated 2—2 in FIG. 1.
Figure 5:
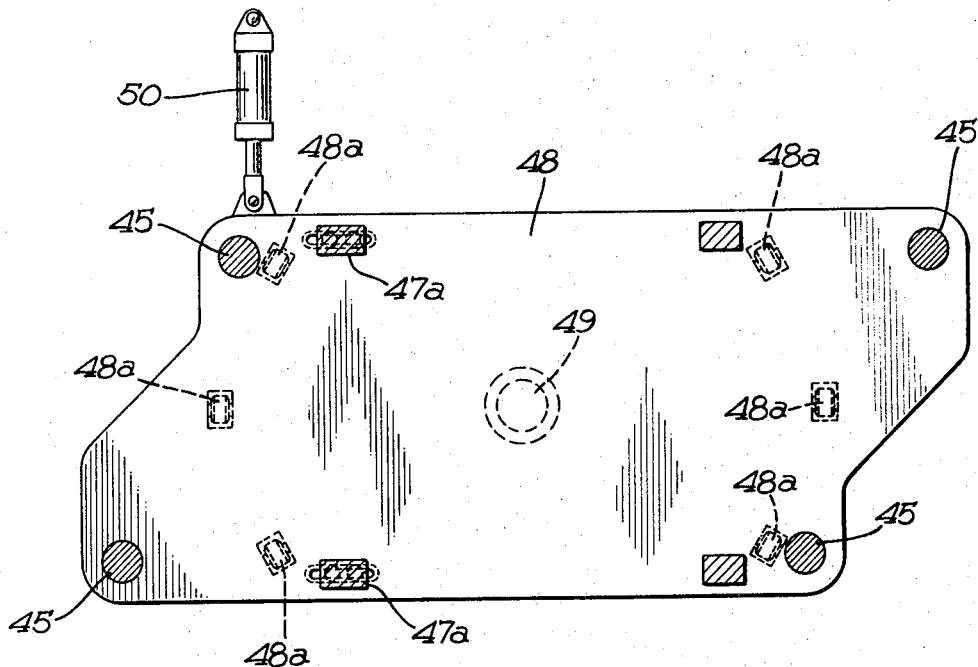
FIG. 5 is a horizontal sectional view taken substantially along the line 5—5 of FIG. 3.

The baseplate 30 is slidably supported on 4 upstanding support rods 45, and a rising and lowering cylinder 46 is provided to move the knives up and down into and out of contact with the cutoff mandrel 25. A suitable scissors-type mounting 47 maintains the desired alignment of the plate 30 during its up and down movement on the pins 45 and stabilizes the position of said plate and knife assembly in all vertical positions thereof. As shown in FIGS. 2 and 5 a slidable mounting 47a is provided for the scissors mounting to facilitate movement thereof.

A lower conveyor mounting plate 48 is pivotably mounted on a bottom base structure of the machine, as by a center pivot pin 49 and means for adjusting the angle of the entire conveyor assembly is provided such as the hydraulic cylinder 50, which is pin-connected to the pivoted mounting plate 48, as shown in FIGS. 1, 3, 5, 6, and 7. Suitable rollers 48a are provided under plate 48 to facilitate this pivotal adjustment.

The knife 40 is supported in a block 54, as best shown in FIG. 10, by screws 55. The block 54 is, in turn, mounted on the plate 41 by screws 56.

As shown in FIGS. 1 and 3, a mandrel stabilizing and supporting system is provided on the top portion of the cutting mandrel 25. The stabilizing and supporting system is implemented by the use of stabilizing caster rollers 52 rotatably mounted on pivot shafts 52a supported by rigid mounting arms 53. Thus, the rollers 52 hold the cutting mandrel 25 and the tubing thereon in positively positioned relationship against both lateral and vertical movement during the cutting operation.

It will be seen that as the tubing is produced by the winding mechanism and travels outwardly along the mandrel 21 and onto the cutoff mandrel 25, the angularly disposed knives will move into cutting engagement with the tubing. The length of knives 40 is slightly longer than the circumference of the tubing, to insure cutting the tubing around its complete circumference. The angle of the conveyor will be adjusted by use of mechanism described above, so that the knives will be disposed at right angles to the axis of the mandrel to produce a straight cutoff at the end of each tube unit.

Whenever the angle of the conveyor carriage is adjusted by actuating the power cylinder 50, the distance between adjacent knives, as measured along the axis of the mandrel will be altered slightly. In order to compensate for these variations, the angle between the knives and conveyor chains may be simultaneously adjusted by means of varying the spacing between the conveyor chains 27a and 27b. Also, by varying the spacing between the conveyor chains, the individual unit lengths of tubing being cut can be varied within the limits of this adjustment.

Two different adjusted positions of the knives, with respect to the mandrel, are illustrated diagrammatically in FIGS. 6 and 7. The important relationship that must be maintained at all times during the cutting operation is the right-angle relationship between the straight knives and the axis of the cutoff mandrel. This is accomplished by simultaneously adjusting the angle of the conveyors and the spacing between the sideplates 31 and 32 as described. Also, it is important that the speed of travel of the knives in a direction axially of the mandrel must be the same as the rectilinear speed of the tubing moving axially along the mandrel.

It will be apparent that the length of the knife mounting plates 41 and the knives 40 remains constant throughout their travel around the path defined by the conveyor chains. This necessitates maintaining the distance between the pivotal connections of the ends of the plates and the respective mounting links 44 of the conveyor chains constant throughout the conveyor path. Therefore, the design of the mounting and adjusting mechanism for varying the space between the conveyor mounting plates must provide a compensating longitudinal adjustment for each transverse adjustment, so that this constant distance can be maintained for each specific adjustment as the plates travel around the ends of the conveyor. This relationship will be maintained by providing the arcuate slots 32a defined by a circular arc having its center disposed at the intersection with the plate 30 of the vertical projection of the axis of the pivot pin 42 at the end of the upper horizontal run of conveyor 27a, the radius of the arc being the distance between the axes of the pivot pin 42.

In operation, the tubing may be produced by a conventional spiral tube winder, as illustrated, the operation of which is well understood in the art, or otherwise formed and directed onto the cutting mandrel 25. As this is a continuous tube formation process, the tube to be cut is advancing at a uniform rate axially onto and along the cutoff mandrel. It is clear that the knife blades must be moving at the same speed axially along the mandrel as the rectilinear speed of the tubing, so that there is no relative axial movement between the tubing and the knives during the cutting operation in order to provide a straight cut at right angles to the tubing axis. In the form of the invention shown herein, the cutoff mandrel is rotated to reduce the friction between the mandrel surface and the tubing. The concept can be clearly understood by reference to FIGS. 1, 6, and 7, in which it is clearly shown that each knife passes entirely underneath the cutting mandrel while the tube on that mandrel is rotated, or is allowed to rotate, exposing the entire circumference of the tubing to the knife passing thereunder, thus cutting a continuously formed tube into individual units.

The adjustment features of this invention can serve many functions. As shown in FIGS. 6 and 7, a simultaneous adjustment of hydraulic cylinders 33 and 50 will change the length of the individual units which are being cut, the simultaneous adjustment being required to maintain the perpendicular relationship of the knives with respect to the axis of the cutting mandrel. One way that this adjustment can be used is to provide a slight variation in the size of container to be cut. Another way that this adjustment feature can be used is to provide the syncronization and proper registration of the labels which have been applied to the tubing with the cutoff points of the individual units. If for some reason in operation, the labels are cut at some point other than the desired end point of the individual unit, the slight momentary adjustment of hydraulic cylinders 33 and 50 to provide a cutoff length other than that of the individual units being formed, will progress the actual cutoff point into correct registration with the label. When correct label registration is achieved, the cutoff mechanism is again returned to establish a cutoff length equal to the cutoff length required by the label imprinting.

It will, of course, be understood that various changes may be made in the form, details, arrangement and proportion of the parts without departing from the scope of the invention, which generally stated, consists in the matter set forth in the accompanying claims.

I claim:

1. A cutoff mechanism for use with a continuous type tube manufacturing machine comprising
   a cutoff mandrel for receiving continuous tubing moving axially from a tube manufacturing machine, a plurality of straightedge cutoff knives, an endless conveyor mechanism positioned at an acute angle with respect to said cutoff mandrel, mounting means for said knives on said conveyor so that said knives are mounted at an angle with respect to the direction of travel of said conveyor, such that said knives are disposed in a perpendicular relationship with respect to the axis of said cutoff mandrel during the cutting operation.

2. The apparatus of claim 1 and means for rotating said cutoff mandrel.

3. The apparatus of claim 1 and means for adjusting the angular relationship of said conveyor mechanism with respect to said cutoff mandrel axis.

4. The apparatus of claim 1 and said endless conveyor mechanism comprising a pair of endless conveyor elements, mounting means for said conveyor elements, said mounting means positioning said conveyor elements in longitudinally offset relationship with one another.

5. The apparatus of claim 4 and spacing adjusting means for adjusting the lateral spacing between said conveyor elements.

6. The apparatus of claim 1 and control means to govern the operation of said endless conveyor elements and said tube manufacturing machine to synchronize the speed of travel of said knives in the axial direction of said mandrel with the axial speed of the tubing traveling on said mandrel.

7. The apparatus of claim 1 and means for moving said knives into and out of cutting engagement with the tubing on said mandrel.

8. The apparatus of claim 1 and mandrel stabilizing means mounted in opposed relation to said cutoff knives.

9. The apparatus of claim 1 and conveyor pivoting means for adjusting the angular relationship of said conveyor mechanism with respect to the axis of said cutoff mandrel.

10. The apparatus of claim 9 and control means for controlling the actuation of said spacing adjusting means and said conveyor pivoting means.

* * * * *